(12) United States Patent
Sandoe et al.

(10) Patent No.: US 9,528,261 B2
(45) Date of Patent: Dec. 27, 2016

(54) SYNTHETIC FIBER INSULATION WITH FACING

(71) Applicant: Vita Nonwovens, LLC, High Point, NC (US)

(72) Inventors: Michael D. Sandoe, Greensboro, NC (US); Timothy J. Warrington, Rural Hall, NC (US)

(73) Assignee: Vita Nonwovens, LLC, High Point, NC (US)

( * ) Notice: Subject to any disclaimer, the term of this patent is extended or adjusted under 35 U.S.C. 154(b) by 90 days.

(21) Appl. No.: 13/737,421

(22) Filed: Jan. 9, 2013

(65) Prior Publication Data

US 2014/0193620 A1 Jul. 10, 2014

(51) Int. Cl.

| | | |
|---|---|---|
| *E04B 1/94* | (2006.01) | |
| *B32B 5/02* | (2006.01) | |
| *B32B 7/12* | (2006.01) | |
| *B32B 15/12* | (2006.01) | |
| *B32B 29/02* | (2006.01) | |
| *E04B 1/76* | (2006.01) | |
| *B32B 5/08* | (2006.01) | |
| *B32B 15/14* | (2006.01) | |

(Continued)

(52) U.S. Cl.
CPC .............. *E04B 1/7662* (2013.01); *B32B 5/022* (2013.01); *B32B 5/08* (2013.01); *B32B 7/12* (2013.01); *B32B 15/14* (2013.01); *B32B 15/20* (2013.01); *B32B 29/02* (2013.01); *D04H 1/541* (2013.01); *B32B 2262/0284* (2013.01); *B32B 2262/101* (2013.01); *B32B 2262/12* (2013.01); *B32B 2307/304* (2013.01); *B32B 2307/3065* (2013.01); *B32B 2307/718* (2013.01); *B32B 2419/00* (2013.01); *B32B 2605/00* (2013.01); *B32B 2605/18* (2013.01); *E04B 2001/7687* (2013.01); *E04B 2001/7691* (2013.01); *Y10T 428/24967* (2015.01)

(58) Field of Classification Search
CPC ........ E04B 1/7662; E04B 1/76; E04B 1/7604; E04B 1/946; B32B 5/02; B32B 5/022; B32B 29/02; B32B 7/12; B32B 15/14; B32B 15/20
USPC ......... 428/215, 292.7, 457, 464, 481, 537.5, 428/219, 220; 442/340, 378, 412; 138/149
See application file for complete search history.

(56) References Cited

U.S. PATENT DOCUMENTS

| | | | |
|---|---|---|---|
| 4,232,620 A | 11/1980 | Kurz | |
| 4,656,082 A * | 4/1987 | Goodacre et al. | ............ 442/232 |
| 4,874,648 A | 10/1989 | Hill et al. | |

(Continued)

OTHER PUBLICATIONS

Evidentiary reference "Technical Bulletin", Insulation Contractors Association of America, obtained from the Internet Dec. 4, 2015.*

*Primary Examiner* — Joanna Pleszczynska

(74) *Attorney, Agent, or Firm* — Myers Bigel, P.A.

(57) ABSTRACT

An insulation product includes a fibrous layer and a facing layer. The fibrous layer includes synthetic fibers, has first and second opposing major surfaces, and has an average denier of less than about 3.0. The facing layer includes a paper-backed facing adhered to one of the first and second major surfaces of the fibrous layer. The insulation product has: a flame spread index of no greater than 25 and a smoke developed index of no greater than 50 as measured in accordance with ASTM E84; a thickness of between about 0.5 and 2 inches; and a thermal conductivity of less than about 0.3 Btu-in./ft$^2$-hr-° F.

18 Claims, 1 Drawing Sheet

(51) Int. Cl.
    *B32B 15/20*     (2006.01)
    *D04H 1/541*     (2012.01)

(56) References Cited

U.S. PATENT DOCUMENTS

| | | |
|---|---|---|
| 5,840,392 A | 11/1998 | Clark et al. |
| 5,971,034 A | 10/1999 | Heisey et al. |
| 5,975,146 A | 11/1999 | Lardillat et al. |
| 6,161,593 A | 12/2000 | Lardillat et al. |
| 6,360,783 B2 | 3/2002 | Faverio, IV et al. |
| 6,527,014 B1 | 3/2003 | Aubourg |
| 6,797,653 B2 | 9/2004 | Fay |
| 6,980,076 B1 | 12/2005 | Rolling et al. |
| 7,153,794 B2 | 12/2006 | Wenstrup et al. |
| 7,223,455 B2 | 5/2007 | Ruid et al. |
| 7,229,938 B2 | 6/2007 | Wenstrup et al. |
| 7,252,868 B2 | 8/2007 | Suda et al. |
| 7,279,438 B1 | 10/2007 | Ruid et al. |
| 7,341,963 B2 | 3/2008 | Wenstrup et al. |
| 7,476,427 B2 | 1/2009 | Ruid |
| 7,544,267 B2 | 6/2009 | Suda |
| 7,625,828 B2 | 12/2009 | Suda et al. |
| 7,754,122 B2 | 7/2010 | Fay |
| 7,798,176 B2 | 9/2010 | Navarro Niedercorn |
| 7,857,923 B2 | 12/2010 | Suda et al. |
| 7,871,947 B2 | 1/2011 | Flack |
| 7,935,410 B2 | 5/2011 | Orologio |
| 2005/0081481 A1* | 4/2005 | Toas .................. E04B 1/767 52/782.1 |
| 2005/0236606 A1 | 10/2005 | Toas et al. |
| 2005/0255284 A1 | 11/2005 | Pritchett |
| 2007/0131299 A1 | 6/2007 | Kornbleet |
| 2008/0050565 A1* | 2/2008 | Gross et al. ............. 428/212 |
| 2009/0094923 A1* | 4/2009 | Weir .................. E04B 1/762 52/506.01 |
| 2009/0133347 A1 | 5/2009 | Wadsworth |
| 2009/0188091 A1* | 7/2009 | Van Kerrebrouck et al. .. 28/108 |
| 2010/0018601 A1 | 1/2010 | Princell et al. |
| 2010/0065206 A1 | 3/2010 | Romes |
| 2010/0193061 A1 | 8/2010 | Princell et al. |
| 2010/0229997 A1* | 9/2010 | Moore et al. ............ 138/149 |
| 2010/0297424 A1 | 11/2010 | Romes et al. |
| 2011/0183096 A1 | 7/2011 | Lembo et al. |

\* cited by examiner

SYNTHETIC FIBER INSULATION WITH FACING

FIELD OF THE INVENTION

The present invention relates generally to synthetic fiber insulation, and more particularly to synthetic fiber insulation with a facing layer for improved performance with respect to flame spread and smoke development.

BACKGROUND

Insulation exhibiting low flame spread and smoke development is desirable for a wide variety of applications. Such applications include insulation for enclosed ducts (e.g., duct liner insulation and duct wrap insulation) and for other enclosed spaces such as public transportation vehicles, plenums in public buildings, motor and electronic enclosures, and aircraft, for example. In many of these applications, the insulation should exhibit a flame spread index of 25 or less and a smoke developed index of 50 or less as measured in accordance with the American Society for Testing and Materials E84 Test entitled "Standard Test Method for Surface Burning Characteristics of Building Materials" (hereinafter referred to as "ASTM E84").

Inorganic fibers such as fiberglass and specially treated foams have been used in such applications. However, fiberglass can break loose in air streams such as ducts and can cause irritation. Specially treated foams tend to be expensive and have reduced acoustic performance. Foams may also have a relatively high smoke toxicity under burning conditions.

Other types of insulation used in these applications are made from materials other than synthetic fibers, such as mineral wool, polyisocyanurate foam, polyimide foam, elastomeric foams and fiberglass. However, disadvantages associated with these insulations may include high cost, relatively poor acoustic performance and/or tendency break loose and cause irritation.

Other natural and synthetic fibers, including para-aramids, meta-aramids and wool fibers, may be used in insulations for resistance to burning. However, as compared to PET fibers, for example, these fibers are larger denier and therefore less desirable for thermal insulators which achieve their maximum thermal resistance with small diameters. Furthermore, blends of para-aramid, meta-aramid and wool fibers with finer diameter PET fibers do not necessarily show low flame spread and low smoke development (i.e., in accordance with ASTM E84).

Insulation materials using synthetic fiber materials have been proposed. For example, U.S. Pat. No. 6,797,653 to Fay proposes a sprayed-on polymer surface against the thermal insulator. The Fay patent does not document weight, thickness, thermal conductivity or surface burning properties per ASTM E84. U.S. Patent Application Publication No. 2009/0133347 to Wadsworth proposes a polymer film against the thermal insulator. The Wadsworth application also does not document various properties such as range of weight, thickness, thermal conductivity and surface burning characteristics.

SUMMARY

According to a first aspect, embodiments of the invention are directed to an insulation product including a fibrous layer and a facing layer. The fibrous layer includes synthetic fibers, has first and second opposing major surfaces, and has an average denier of less than about 3.0. The facing layer includes a paper-backed facing adhered to one of the first and second major surfaces of the fibrous layer. The insulation product has: a flame spread index of no greater than 25 and a smoke developed index of no greater than 50 as measured in accordance with ASTM E84; a thickness of between about 0.5 and 2 inches; and a thermal conductivity of less than about 0.3 Btu-in./ft$^2$-hr-° F.

According to a second aspect, embodiments of the invention are directed to an insulation product including a synthetic fibrous layer and a paper-backed facing layer. The synthetic fibrous layer includes PET fibers, has first and second opposing major surfaces, and has an average denier of less than about 2.5. The paper-backed facing layer includes a paper layer and a metallic layer, with the paper layer adhered to one of the first and second major surfaces of the synthetic fibrous layer. The insulation product has: a flame spread index of no greater than 25 and a smoke developed index of no greater than 50 as measured in accordance with ASTM E84; a product thickness of between about 0.5 and 2 inches; and a thermal conductivity of less than about 0.3 Btu-in./ft$^2$-hr-° F. In some embodiments, the PET fibers are between about 20% and 70% by weight standard staple fibers, between about 0% and 50% flame retardant staple fibers and between about 20% and 40% by weight sheath-core bicomponent fibers.

According to a third aspect, embodiments of the invention are directed to an insulation product including a synthetic fibrous layer and a paper-backed facing layer. The synthetic fibrous layer includes PET fibers, has first and second opposing major surfaces, and has an average denier of less than about 3.0. The paper-backed facing layer includes a paper layer and a metallic layer, with the paper layer adhered to one of the first and second major surfaces of the synthetic fibrous layer by a thermoplastic adhesive. The insulation product has: a flame spread index of no greater than 25 and a smoke developed index of no greater than 50 as measured in accordance with ASTM E84; a product thickness of between about 0.5 and 2 inches; a weight of between about 1 and 4 osf; and a thermal conductivity of less than about 0.3 Btu-in./ft$^2$-hr-° F.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
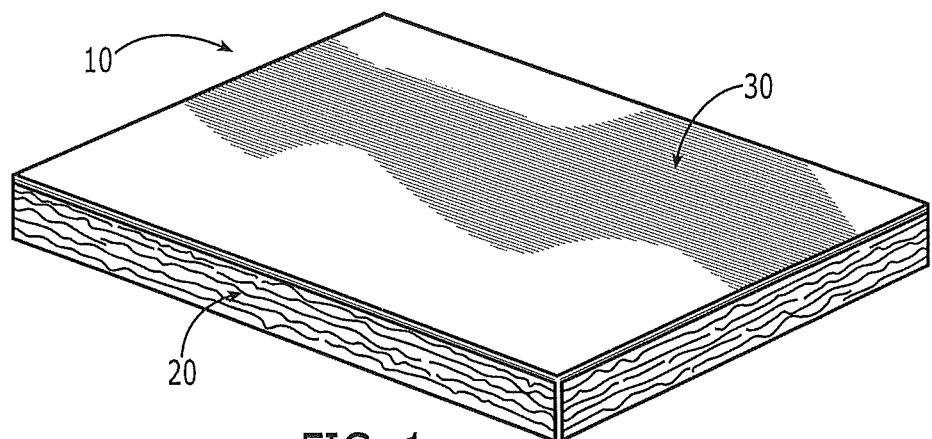
FIG. 1 is a schematic top perspective view of a section of an insulation product including a fibrous layer and a facing layer according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

As used herein, the term "about" used in connection with a claimed value means +/−20% of the claimed value in some embodiments.

Figure 2:
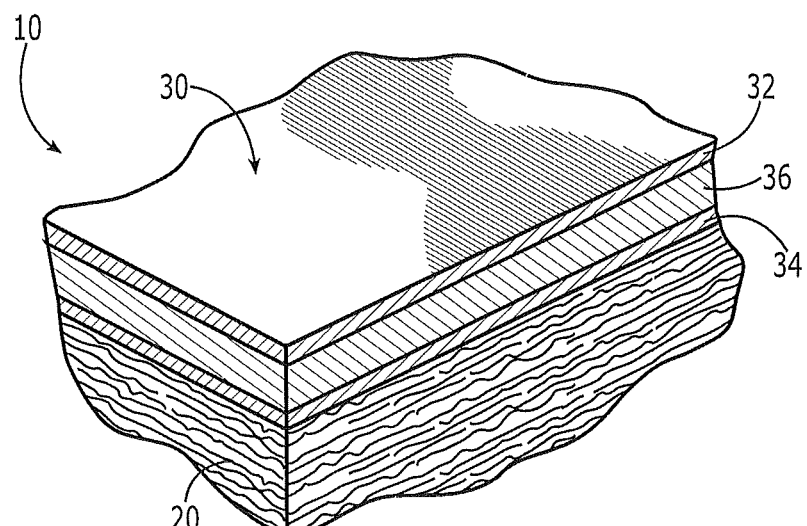
FIG. 2 is a schematic enlarged view of a portion of the insulation product of FIG. 1 illustrating details of the facing layer according to some embodiments.

An insulation product 10 according to some embodiments is shown in FIGS. 1 and 2. The insulation product 10 includes a fibrous thermal insulator layer 20 and a facing layer 30. The fibrous layer 20 includes first and second opposing major surfaces, and the facing layer 30 is attached (e.g., adhered) to one of the first and second major surfaces.

The fibrous layer 20 may be formed in any manner known to those of skill in the art to be suitable for the formation of nonwoven fabrics. For example, fibers may be opened and blended, then carded to form a web. The web may be cross-lapped to add loft and weight. The web may then be passed through a bonding oven, and then may be passed through a calendar roll in order to set thickness. The fabric may also be formed using an air lay process.

The fibrous layer 20 may include synthetic fibers, such as polyethylene terephthalate (PET) fibers. In some embodiments, all or substantially all of the fibers in the fibrous layer 20 are PET fibers. At least some of the PET fibers may be flame retardant fibers. The fibrous layer 20 may also include bicomponent fibers, such as coPETPET sheath-core bicomponent fibers.

In some embodiments, the fibrous layer 20 includes between about between about 20% and about 70% by weight standard staple fibers, between about 0% and about 50% flame retardant staple fibers and between about 20% and about 40% by weight bicomponent fibers. In some embodiments, the fibrous layer 20 includes between 20% and 70% by weight standard staple fibers, between 0% and 50% flame retardant staple fibers and between 20% and 40% by weight bicomponent fibers.

The fibers of the fibrous layer 20 may be sized such that the fibrous layer 20 has an average denier of less than about 3.0 denier or less than 3.0 denier. In other embodiments, the fibrous layer 20 has an average denier of less than about 2.5 denier or less than 2.5 denier. In yet other embodiments, the fibrous layer 20 has an average denier of no greater than about 2.1 denier or no greater than 2.1 denier.

The facing layer 30 typically is or includes a paper-backed facing. In the embodiment illustrated in FIG. 2, the facing layer 30 includes a paper layer 34 and a metallic layer 32. For example, the metallic layer 32 may be a layer of aluminum (e.g., an aluminum foil layer). As illustrated, the facing layer 30 may also include a reinforcing layer 36. The reinforcing layer 36 may include fiberglass, such as tri-directional fiberglass. The metallic layer 32, paper layer 34 and reinforcing layer 36 may be laminated together using a flame retardant adhesive. A suitable facing layer is Foil/Scrim/Kraft (FSK) facing such as grade R-3035 FSK facing available from Lamtec Corp. in Mount Bethel, Pa.

The facing layer 30 may be laminated to the fibrous layer 20 using a thermoplastic adhesive. A suitable adhesive is PE2900 thermoplastic PET adhesive available from Spunfab, Ltd. in Cuyahoga Falls, Ohio.

The insulation product 10 has a flame spread index of no greater than 25 and a smoke developed index of no greater than 50 as measured in accordance with ASTM E84. In some embodiments, the insulation product 10 has a weight of between about 1 and about 4 ounces per square foot (osf) or a weight between 1 and 4 osf. In some embodiments, the insulation product 10 has a thermal conductivity of no greater than about 0.3 Btu-in./ft$^2$-hr-° F. or a thermal conductivity of no greater than 0.3 Btu-in./ft$^2$-hr-° F. In some embodiments, the insulation product 10 has a thickness of between about 0.5 and about 2 inches or a thickness between 0.5 and 2 inches. In some embodiments, the insulation product 10 has a density of no greater than about 2 pounds per cubic foot (pcf) or a density of no greater than 2 pcf. In some embodiments, the insulation product 10 has a thermal resistance (R-value) of between about 2 and about 8.5 hr-ft$^2$-° F./Btu.

The advantages of the insulation product 10 are best seen by reviewing various samples of insulation products according to the invention and by reviewing comparative examples.

Table 1 illustrates the properties and test results of various samples including a fibrous layer having all PET fibers and a paper-backed facing layer adhered thereto.

TABLE 1

| Example | Flame Spread Rating (ASTM E84) | Smoke Developed (ASTM E84) | Product Weight (osf) | Product Thickness (inches) | Product Density (pcf) | Thermal R-Value (hr-ft²-°F./Btu) | Thermal Conductivity (Btu-in./ft²-hr-°F.) |
|---|---|---|---|---|---|---|---|
| 1 | 10 | 15 | 1.9 | 1.125 | 1.27 | 4.74 | 0.24 |
| 2 | 15 | 25 | 1.9 | 1.125 | 1.27 | 4.76 | 0.24 |
| 3 | 15 | 30 | 1.9 | 1.125 | 1.27 | 4.43 | 0.25 |
| 4 | 0 | 40 | 1.72 | 1.26 | 1.02 | N/A | N/A |
| 5 | 5 | 40 | 2.9 | 1.5 | 1.45 | 5.9 | 0.25 |
| 6 | 0 | 40 | 3.7 | 2.0 | 1.39 | 8.34 | 0.24 |
| 7 | 5 | 15 | 1.3 | 0.5 | 1.95 | 1.92 | 0.26 |

In Example 1, a fibrous layer of 100% PET fibers was carded, cross-lapped and thermal-bonded. The fiber blend included 20% by weight 0.7 denier staple fibers available from Huvis, 30% by weight 2 denier sheath-core bicomponent fibers available from Huvis and 50% by weight 3 denier flame retardant staple fibers available from Huvis. After processing, the fiber blend had an average denier of 2.1, a weight of 1.5 osf and a thickness of 1.115 inches. Grade R-3035 FSK from Lamtec having a weight of 0.35 osf and a thickness of 0.01 inches was laminated to the nonwoven fabric using Spunfab PE2900 web adhesive having a basis weight of 0.45 ounces per square yard (osy) or 0.05 osf, thereby joining the paper-backing of the FSK to the PET nonwoven thermal insulator. The final weight and thickness of the PET nonwoven/FSK composite was 1.9 osf and 1.125 inches, respectively. Test results per ASTM E84 burn testing indicated a flame spread index of 10 and a smoke developed index of 15, within the limits required for duct liner insulation and other insulation applications in enclosed spaces. Density of the sample was 1.27 pounds per cubic foot (pcf) and thermal resistance was 4.74 hr-ft²-F/Btu per ASTM C518.

In Example 2, a fibrous layer of 100% PET fibers was carded, cross-lapped and thermal-bonded. The fiber blend included 45% by weight 1.2 denier staple fibers available from Poole, 30% by weight 2 denier sheath-core bicomponent fibers available from Huvis and 25% by weight 1.5 denier flame retardant staple fibers available from Huvis. After processing, the fiber blend had an average denier of 1.36, a weight of 1.5 osf and a thickness of 1.115 inches. Grade R-3035 FSK from Lamtec having a weight of 0.35 osf and a thickness of 0.01 inches was laminated to the nonwoven fabric using Spunfab PE2900 web adhesive having a basis weight of 0.45 osy, thereby joining the paper-backing of the FSK to the PET nonwoven thermal insulator. The final weight and thickness of the PET nonwoven/FSK composite was 1.9 osf and 1.125 inches, respectively. Test results per ASTM E84 burn testing indicated a flame spread index of 15 and a smoke developed index of 25, within the limits required for duct liner insulation and other insulation applications in enclosed spaces. Density of the sample was 1.27 pcf and thermal resistance was 4.76 hr-ft²-F/Btu per ASTM C518.

In Example 3, a fibrous layer of 100% PET fibers was carded, cross-lapped and thermal-bonded. The fiber blend included 70% by weight 1.2 denier staple fibers available from Poole and 30% by weight 2 denier sheath-core bicomponent fibers available from Huvis. After processing, the fiber blend had an average denier of 1.29, a weight of 1.5 osf and a thickness of 1.115 inches. Grade R-3035 FSK from Lamtec having a weight of 0.35 osf and a thickness of 0.01 inches was laminated to the nonwoven fabric using Spunfab PE2900 web adhesive having a basis weight of 0.45 osy, thereby joining the paper-backing of the FSK to the PET nonwoven thermal insulator. The final weight and thickness of the PET nonwoven/FSK composite was 1.9 osf and 1.125 inches, respectively. Test results per ASTM E84 burn testing indicated a flame spread index of 15 and a smoke developed index of 30, within the limits required for duct liner insulation and other insulation applications in enclosed spaces. Density of the sample was 1.27 pcf and thermal resistance was 4.43 hr-ft²-F/Btu per ASTM C518. The permeability of the sample was 4.2 cubic feet per minute (cfm) at 125 Pa as measured in accordance with ASTM D737, approximately equal to 6,500 MKS rayls measured in accordance with ASTM C522. A noise reduction coefficient (NRC) of 0.65 was calculated in accordance with ASTM C423. Smoke toxicity, measured in accordance with ASTM E800, included 21 ppm CO and 0 ppm "other" (including HBr, HCl, HCN, HF, NOx and SO2).

In Example 4, a fibrous layer of 100% PET fibers was carded, cross-lapped and thermal-bonded. The fiber blend included 20% by weight 1.2 denier staple fibers available from Poole, 30% by weight 2 denier sheath-core bicomponent fibers available from Huvis and 50% by weight 3 denier flame retardant staple fibers available from Huvis. After processing, the fiber blend had an average denier of 2.19, a weight of 1.32 osf and a thickness of 1.25 inches. Grade R-3035 FSK from Lamtec having a weight of 0.35 osf and a thickness of 0.01 inches was laminated to the nonwoven fabric using Spunfab PE2900 web adhesive having a basis weight of 0.45 osy, thereby joining the paper-backing of the FSK to the PET nonwoven thermal insulator. The final weight and thickness of the PET nonwoven/FSK composite was 1.72 osf and 1.26 inches, respectively. Test results per ASTM E84 burn testing indicated a flame spread index of 0 and a smoke developed index of 40, within the limits required for duct liner insulation and other insulation applications in enclosed spaces. Density of the sample was 1.02 pcf. An NRC of 0.65 was calculated in accordance with ASTM C423.

In Example 5, a fibrous layer of 100% PET fibers was carded, cross-lapped and thermal-bonded. The fiber blend included 70% by weight 1.2 denier staple fibers available from Poole and 30% by weight 2 denier sheath-core bicomponent fibers available from Huvis. After processing, the fiber blend had an average denier of 1.29, a weight of 2.5 osf and a thickness of 1.49 inches. Grade R-3035 FSK from Lamtec having a weight of 0.35 osf and a thickness of 0.01 inches was laminated to the nonwoven fabric using Spunfab PE2900 web adhesive having a basis weight of 0.45 osy, thereby joining the paper-backing of the FSK to the PET nonwoven thermal insulator. The final weight and thickness of the PET nonwoven/FSK composite was 2.9 osf and 1.5 inches, respectively. Test results per ASTM E84 burn testing indicated a flame spread index of 5 and a smoke developed index of 40, within the limits required for duct liner insulation and other insulation applications in enclosed spaces. Density of the sample was 1.45 pcf and thermal resistance was 5.9 hr-ft$^2$-F/Btu per ASTM C518. An NRC of 0.7 was calculated in accordance with ASTM C423. Smoke toxicity, measured in accordance with ASTM E800, included 21 ppm CO and 0 ppm "other" (including HBr, HCl, HCN, HF, NOx and SO2).

In Example 6, a fibrous layer of 100% PET fibers was carded, cross-lapped and thermal-bonded. The fiber blend included 70% by weight 1.2 denier staple fibers available from Poole and 30% by weight 2 denier sheath-core bicomponent fibers available from Huvis. After processing, the fiber blend had an average denier of 1.29, a weight of 3.3 osf and a thickness of 1.99 inches. Grade R-3035 FSK from Lamtec having a weight of 0.35 osf and a thickness of 0.01 inches was laminated to the nonwoven fabric using Spunfab PE2900 web adhesive having a basis weight of 0.45 osy, thereby joining the paper-backing of the FSK to the PET nonwoven thermal insulator. The final weight and thickness of the PET nonwoven/FSK composite was 3.7 osf and 2.0 inches, respectively. Test results per ASTM E84 burn testing indicated a flame spread index of 0 and a smoke developed index of 40, within the limits required for duct liner insulation and other insulation applications in enclosed spaces. Density of the sample was 1.39 pcf and thermal resistance was 8.34 hr-ft$^2$-F/Btu per ASTM C518. An NRC of 0.7 was calculated in accordance with ASTM C423. Smoke toxicity, measured in accordance with ASTM E800, included 21 ppm CO and 0 ppm "other" (including HBr, HCl, HCN, HF, NOx and SO2).

In Example 7, a fibrous layer of 100% PET fibers was carded, cross-lapped and thermal-bonded. The fiber blend included 70% by weight 1.2 denier staple fibers available from Poole and 30% by weight 2 denier sheath-core bicomponent fibers available from Huvis. After processing, the fiber blend had an average denier of 1.29, a weight of 0.9 osf and a thickness of 0.49 inches. Grade R-3035 FSK from Lamtec having a weight of 0.35 osf and a thickness of 0.01 inches was laminated to the nonwoven fabric using Spunfab PE2900 web adhesive having a basis weight of 0.45 osy, thereby joining the paper-backing of the FSK to the PET nonwoven thermal insulator. The final weight and thickness of the PET nonwoven/FSK composite was 1.3 osf and 0.5 inches, respectively. Test results per ASTM E84 burn testing indicated a flame spread index of 5 and a smoke developed index of 15, within the limits required for duct liner insulation and other insulation applications in enclosed spaces. Density of the sample was 1.95 pcf and thermal resistance was 1.92 hr-ft$^2$-F/Btu. Smoke toxicity, measured in accordance with ASTM E800, included 21 ppm CO and 0 ppm "other" (including HBr, HCl, HCN, HF, NOx and SO2).

Table 2 illustrates the properties and test results of various comparative samples. These samples did not include a paper-backed facing. As will be described in more detail below, the samples of Comparative Examples 1, 2 and 9 included an aluminized mylar facing layer and the remaining samples did not include a facing layer. In addition, the fibrous layer for Comparative Examples 4 and 5 did not include 100% PET fibers.

TABLE 2

| Comparative Example | Flame Spread Rating (ASTM E84) | Smoke Developed (ASTM E84) | Product Weight (osf) | Product Thickness (inches) | Product Density (pcf) | Thermal R-Value (hr-ft$^2$-° F./Btu) | Thermal Conductivity (Btu-in./ft$^2$-hr-° F.) |
|---|---|---|---|---|---|---|---|
| 1 | 0 | 190 | 2.1 | 1.25 | 1.21 | N/A | N/A |
| 2 | 5 | 65 | 0.5 | 0.4 | 0.94 | 1.2 | 0.33 |
| 3 | 5 | 160 | 4 | 5 | 0.60 | 13.3 | 0.26 |
| 4 | 105 | 175 | 1.5 | 1.125 | 1.00 | N/A | N/A |
| 5 | 5 | 120 | 1.5 | 1.125 | 1.00 | N/A | N/A |
| 6 | 5 | 120 | 4 | 0.5 | 6.00 | N/A | N/A |
| 7 | 5 | 135 | 4 | 0.5 | 6.00 | N/A | N/A |
| 8 | 20 | 150 | 5.3 | 1 | 3.98 | N/A | N/A |
| 9 | 10 | 110 | 1.35 | 1.003 | 1.01 | N/A | N/A |

In Comparative Example 1, a fibrous layer of 100% PET fibers was carded, cross-lapped and thermal-bonded. The fiber blend included 20% by weight 0.7 denier staple fibers available from Huvis, 30% by weight 2 denier sheath-core bicomponent fibers available from Huvis and 50% by weight 3 denier flame retardant staple fibers available from Huvis. After processing, the fiber blend had an average denier of 2.09, a weight of 2 osf and a thickness of 1.247 inches. Aluminized mylar having a weight of 0.1 osf and a thickness of 0.003 inches was laminated to the PET nonwoven thermal insulator. The final weight and thickness of the PET nonwoven/aluminized mylar composite was 2.1 osf and 1.25 inches, respectively. Test results per ASTM E84 burn testing indicated a flame spread index of 0 and a smoke developed index of 190, outside the limits required for duct liner insulation and other insulation applications in enclosed spaces.

In Comparative Example 2, a fibrous layer of 100% PET fibers was carded, cross-lapped and thermal-bonded. The fiber blend included 35% by weight 7 denier hollow conjugated fibers available from Huvis, 25% by weight 2 denier sheath-core bicomponent fibers available from Huvis and 40% by weight 6 denier flame retardant staple fibers available from Huvis. After processing, the fiber blend had an average denier of 5.22, a weight of 0.4 osf and a thickness of 0.397 inches. Aluminized mylar having a weight of 0.1 osf and a thickness of 0.003 inches was laminated to the PET nonwoven thermal insulator. The final weight and thickness of the PET nonwoven/aluminized mylar composite was 0.5 osf and 0.4 inches, respectively. Test results per ASTM E84 burn testing indicated a flame spread index of 5 and a smoke developed index of 65, outside the limits required for duct liner insulation and other insulation applications in enclosed spaces. Thermal resistance of the sample was only 1.2 hr-ft²-F/Btu per ASTM C518.

In Comparative Example 3, a fibrous layer of 100% PET fibers was carded, cross-lapped and thermal-bonded. The fiber blend included 25% by weight 0.7 denier staple fibers available from Huvis, 10% by weight 1.5 denier staple fibers available from Huvis, 15% by weight 1.5 denier green staple fibers available from Hop Thanh and 50% by weight 2 denier sheath-core bicomponent fibers available from Huvis. After processing, the fiber blend had an average denier of 1.30, a weight of 4.0 osf and a thickness of 5.0 inches. No facing layer was applied. Test results per ASTM E84 burn testing indicated a flame spread index of 5 and a smoke developed index of 160, outside the limits required for duct liner insulation and other insulation applications in enclosed spaces.

In Comparative Example 4, fibers were carded, cross-lapped and thermal-bonded. The fiber blend included 20% by weight 0.7 denier staple fibers available from Huvis, 30% by weight 2 denier sheath-core bicomponent fibers available from Huvis, 20% by weight 3 denier flame retardant staple fibers available from Huvis and 30% by weight Leigh 63-A-2063 para-aramid waste fibers. After processing, the fiber blend had a weight of 1.5 osf and a thickness of 1.125 inches. No facing layer was applied. Test results per ASTM E84 burn testing indicated a flame spread index of 105 and a smoke developed index of 175, well outside the limits required for duct liner insulation and other insulation applications in enclosed spaces.

In Comparative Example 5, fibers were carded, cross-lapped and thermal-bonded. The fiber blend included 20% by weight 0.7 denier staple fibers available from Huvis, 30% by weight 2 denier sheath-core bicomponent fibers available from Huvis, 20% by weight 3 denier flame retardant staple fibers available from Huvis, and 30% by weight reclaim wool fibers available from Pozzi. After processing, the fiber blend had a weight of 1.5 osf and a thickness of 1.125 inches. No facing layer was applied. Test results per ASTM E84 burn testing indicated a flame spread index of 5 and a smoke developed index of 120, outside the limits required for duct liner insulation and other insulation applications in enclosed spaces.

In Comparative Example 6, a fibrous layer of 100% PET fibers was carded, cross-lapped and thermal-bonded. The fiber blend included 1.2 denier and 2 denier bicomponent fibers, both available from Huvis, and 6 denier staple fibers available from Stein Fibers. After processing, the fiber blend had a weight of 4.0 osf and a thickness of 0.5 inches. No facing layer was applied. Test results per ASTM E84 burn testing indicated a flame spread index of 5 and a smoke developed index of 120, outside the limits required for duct liner insulation and other insulation applications in enclosed spaces.

In Comparative Example 7, a fibrous layer of 100% PET fibers was carded, cross-lapped and thermal-bonded. The fiber blend included 25% by weight recycled 1.2 denier staple fibers available from Poole, 25% by weight 1.5 denier recycled green staple fibers available from Hop Thanh and 50% by weight 2 denier bicomponent fibers available from Huvis. After processing, the fiber blend had a weight of 4.0 osf and a thickness of 0.5 inches. No facing layer was applied. Test results per ASTM E84 burn testing indicated a flame spread index of 5 and a smoke developed index of 135, outside the limits required for duct liner insulation and other insulation applications in enclosed spaces.

In Comparative Example 8, a fibrous layer of 100% PET fibers was carded, cross-lapped and thermal-bonded. The fiber blend included 50% by weight 1.5 denier staple fibers and 50% by weight 4 denier bicomponent fibers, all available from Huvis. After processing, the fiber blend had a weight of 5.3 osf and a thickness of 1.0 inch. No facing layer was applied. Test results per ASTM E84 burn testing indicated a flame spread index of 20 and a smoke developed index of 150, outside the limits required for duct liner insulation and other insulation applications in enclosed spaces.

In Comparative Example 9, a fibrous layer of 100% PET fibers was carded, cross-lapped and thermal-bonded. The fiber blend included 20% by weight 1.2 denier staple fibers and 30% by weight 2 denier bicomponent fibers, both available from Huvis, 30% by weight 3 denier flame retardant staple fibers available from Hoechst, and 20% by weight 7 denier conjugated fibers, available from Stein Fibers. After processing, the fiber blend had a weight of 1.25 osf and a thickness of 1.0 inch. Aluminized mylar having a weight of 0.1 osf and a thickness of 0.003 inches was laminated to the PET nonwoven thermal insulator. The final weight and thickness of the PET nonwoven/aluminized mylar composite was 1.35 osf and 1.003 inches, respectively. Test results per ASTM E84 burn testing indicated a flame spread index of 10 and a smoke developed index of 110, outside the limits required for duct liner insulation and other insulation applications in enclosed spaces.

The above examples and comparative examples illustrate that the an insulation product having a 100% PET fibrous layer and a paper-backed facing layer provides advantages including low thickness, weight, and thermal conductivity while still meeting the burn test requirements under ASTM E84.

A direct comparison of Example 1 and Comparative Example 1 illustrates the effectiveness of utilizing the paper-backed facing. Both samples include a similar fibrous web having a similar average denier and thickness. However, the provision of an aluminized mylar facing in Comparative Example 1 results in an ASTM E84 smoke developed index of 190, which is well outside the requirements for many applications. Comparative Example 2 illustrates that smoke development performance may be improved by substantially increasing the diameters of the fibers. However, even with a relatively high average denier of 5.22, the sample of Comparative Example 2 still exhibited an ASTM E84 smoke developed index of 65, which is outside the requirements for many applications. Furthermore, the high average denier results in reduced insulative performance, as evidenced by the sample having a thermal resistance of only 1.2 hr-ft²-F/Btu as measured in accordance with ASTM C518.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. An insulation product, consisting essentially of:
   a fibrous layer comprising synthetic fibers, the fibrous layer having first and second opposing major surfaces, the fibrous layer having an average denier of less than about 3.0; and
   a paper-backed facing layer comprising a paper layer and a metallic layer, the paper layer adhered to only one of the first and second major surfaces of the fibrous layer, wherein the facing layer is a Foil/Scrim/Kraft (FSK) facing layer, and wherein the facing layer has a thickness of about 0.01 inches and a weight of about 0.35 osf;
   wherein the insulation product has a flame spread index of no greater than 25 and a smoke developed index of no greater than 50 as measured in accordance with ASTM E84, wherein the insulation product has a thickness of between about 0.5 and about 2 inches, wherein the insulation product has a density at least about 1.27 pcf, and wherein the insulation product has a thermal conductivity of less than about 0.3 Btu-in./ft$^2$-hr-° F.

2. The insulation product of claim 1, wherein the fibrous layer comprises PET fibers.

3. The insulation product of claim 1, wherein the fibrous layer has an average denier of less than about 2.5.

4. The insulation product of claim 1, wherein the fibrous layer has an average denier of no greater than 2.1.

5. The insulation product of claim 1, wherein the metallic layer is an aluminum foil layer.

6. The insulation product of claim 1, wherein the facing layer further includes a reinforcing layer disposed between the paper layer and the metallic layer.

7. The insulation product of claim 1, wherein the insulation product has a thermal resistance of between about 2 and about 8.5 hr-ft$^2$-° F./Btu.

8. The insulation product of claim 1, wherein the insulation product has a weight of between about 1 and about 4 osf.

9. The insulation product of claim 1, wherein the insulation product has a density of less than about 2 pcf.

10. The insulation product of claim 1, wherein the fibrous layer comprises PET fibers, the PET fibers being between about 20% and about 70% by weight standard staple fibers, between about 0% and about 50% flame retardant staple fibers and between about 20% and about 40% by weight bicomponent fibers.

11. The insulation product of claim 1, wherein the facing layer is adhered to the fibrous layer by a thermoplastic adhesive.

12. An insulation product, consisting essentially of:
    a synthetic fibrous layer comprising PET fibers, the fibrous layer having first and second opposing major surfaces, the fibrous layer having an average denier of less than about 2.5; and
    a paper-backed facing layer comprising a paper layer and a metallic layer, the paper layer adhered to only one of the first and second major surfaces of the synthetic fibrous layer, wherein the facing layer is a Foil/Scrim/Kraft (FSK) facing layer, the facing layer has a thickness of about 0.01 inches and a weight of about 0.35 osf;
    wherein the insulation product has a flame spread index of no greater than 25 and a smoke developed index of no greater than 50 as measured in accordance with ASTM E84, wherein the insulation product has a product thickness of between about 0.5 and about 2 inches, wherein the insulation product has a weight of between 1 and 4 osf, wherein the insulation product has a density at least about 1.27 pcf, and wherein the insulation product has a thermal conductivity of less than about 0.3 Btu-in./ft$^2$-hr-° F.

13. The insulation product of claim 12, wherein the facing layer further includes a reinforcing layer disposed between the paper layer and the metallic layer.

14. The insulation product of claim 13, wherein the reinforcing layer comprises fiberglass.

15. The insulation product of claim 12, wherein the PET fibers are between about 20% and about 70% by weight standard staple fibers, between about 0% and about 50% flame retardant staple fibers and between about 20% and about 40% by weight sheath-core bicomponent fibers.

16. The insulation product of claim 12, wherein the facing layer is adhered to the fibrous layer by a thermoplastic adhesive.

17. An insulation product, consisting essentially of:
    a synthetic fibrous layer comprising PET fibers, the fibrous layer having first and second opposing major surfaces, the fibrous layer having an average denier of less than about 3.0; and
    a paper-backed Foil/Scrim/Kraft (FSK) facing layer comprising a paper layer and a metallic layer, the paper layer adhered to only one of the first and second major surfaces of the synthetic fibrous layer by a thermoplastic adhesive;
    wherein the insulation product has a flame spread index of no greater than 25 and a smoke developed index of no greater than 50 as measured in accordance with ASTM E84, wherein the insulation product has a product thickness of between about 0.5 and about 2 inches, wherein the insulation product has a weight of between about 1 and about 4 osf, wherein the insulation product has a density at least about 1.27 pcf, and wherein the insulation product has a thermal conductivity of less than about 0.3 Btu-in./ft$^2$-hr-° F., wherein the facing layer has a thickness of about 0.01 inches and a weight of about 0.35 osf.

18. The insulation product of claim 1, wherein the insulation product is duct liner insulation.

* * * * *